UNITED STATES PATENT OFFICE.

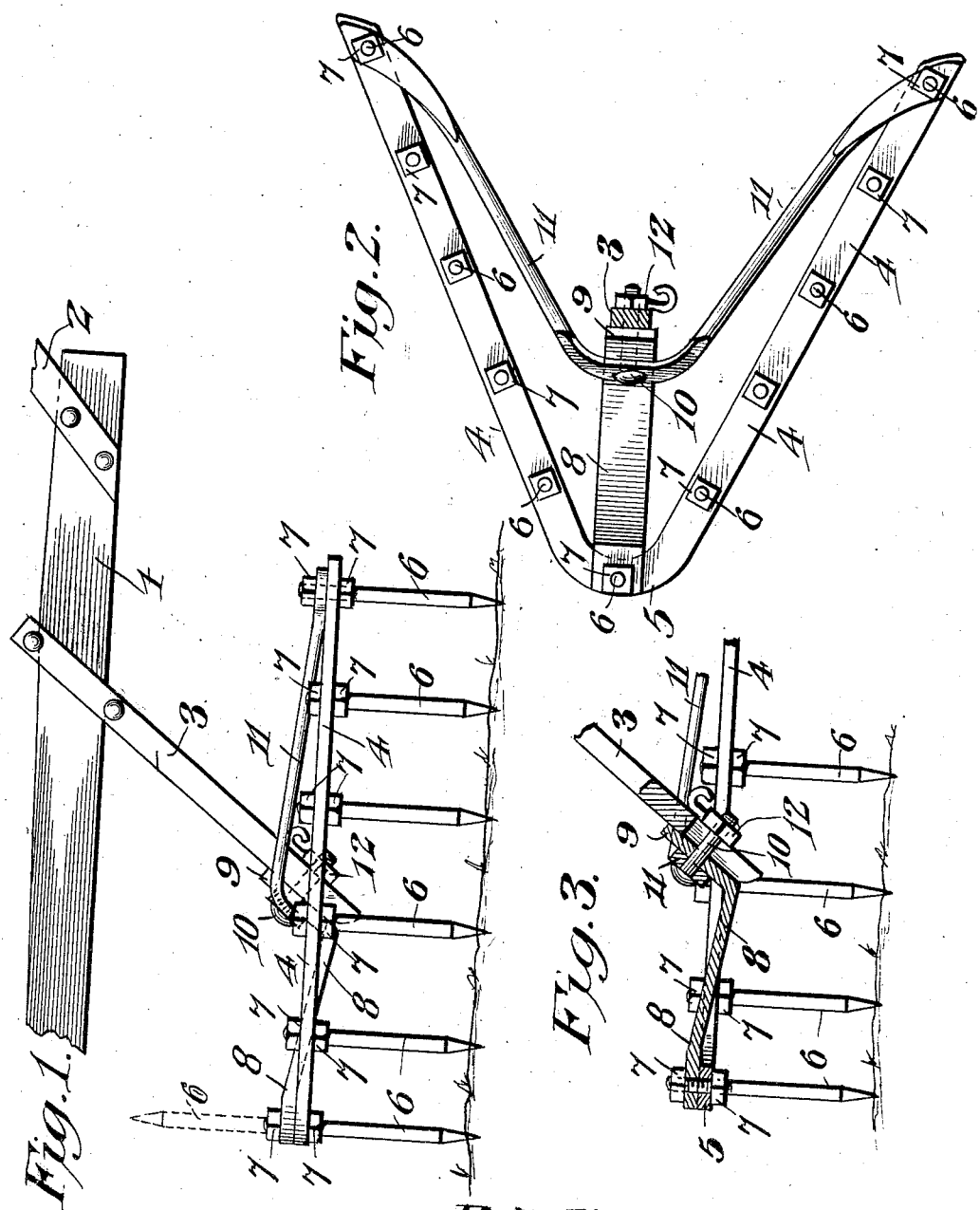

ROBERT DAVID WHITT, OF McNEIL, ARKANSAS.

HARROW.

978,804.  Specification of Letters Patent.  Patented Dec. 13, 1910.

Application filed April 12, 1910.  Serial No. 555,041.

*To all whom it may concern:*

Be it known that I, ROBERT D. WHITT, a citizen of the United States, residing at McNeil, in the county of Columbia and State of Arkansas, have invented a new and useful Harrow, of which the following is a specification.

This invention relates to improvements in harrows and one object of the invention is to provide a simple and strong harrow which may be readily attached to any ordinary plow foot or stock and which, when in use, will travel smoothly and easily over the ground without any lateral twisting movement.

A further object of the invention is to provide a harrow of the character set forth which may be applied to the plow foot or stock in a very short time by an unskilled person and without the use of complicated tools, and which will be strong and durable without excessive weight.

These stated objects, and such other incidental objects as will hereinafter appear, are attained in the use of the device illustrated in the accompanying drawings, and the invention consists in certain novel features of the same which will be hereinafter first fully described and then more particularly pointed out in the appended claims.

In the drawings, Figure 1 is a side elevation of a harrow embodying my invention and showing the same applied to a plow foot. Fig. 2 is a plan view of the same with the plow foot in section. Fig. 3 is a detail longitudinal section of the front end of the harrow.

The plow beam 1 may be of any desired construction and is equipped with handles 2 and a foot or stock 3. In carrying out my present invention, I employ a substantially V-shaped frame 4 consisting of a metallic bar having a central curved portion 5 constituting the front end of the harrow, and side arms diverging rearward from the said front portion or point. At intervals along the V-shaped bar, I form openings through which harrow teeth 6 are inserted and in which the said teeth are secured by means of nuts 7 mounted on the said teeth and turned home against the upper and lower sides of the bar, as shown and as will be readily understood. A connecting plate 8 is secured to the point or front portion 5 of the frame and extends longitudinally rearward therefrom and has its rear end bent upward, as shown at 9, to provide a lip adapted to bear against the front side of the plow stock or foot and be secured thereto by the bolt 10 which ordinarily secures the plow shovel. To the rear ends of the frame I secure the ends of a V-shaped brace 11 which converges forward from the said ends and has its central portion passing across the front side of the lip 9 and secured thereto by the bolt 10. The teeth 6 are preferably straight cylindrical pointed bodies having threaded ends to receive the nuts 7 whereby, should the exigencies of any particular circumstances demand that some of the teeth be cut out of operation, the said teeth may be removed and then inverted and then secured in the inverted position, as indicated by dotted lines in Fig. 1, whereby the loss of the teeth will be prevented, and they will be at hand should it be desired to again bring them into an operative position. The several parts are secured to the plow foot by the bolt 10 inserted through registering openings in the brace 11 and the lip 9 and extending through the end of the plow foot and carrying a nut 12 which is turned home against the rear side of the plow foot so as to clamp the parts firmly together, as will be readily understood on reference to Fig. 3.

From the foregoing description, taken in connection with the accompanying drawings, it will be seen that I have provided an exceedingly simple and durable harrow which may be readily attached to any ordinary plow foot or stock and which, when in use, will move over the ground easily and without any lateral movement, inasmuch as both the rear ends and the front point of the harrow frame are connected with the plow foot by rigid braces and connecting plates, so that the device will be held positively and firmly in its proper relation with the plow foot. In order to attach my harrow to the plow foot, it is necessary merely to remove the plow shovel and then insert the bolt which held the shovel through the registering openings in the brace 11, the plate 8 and the end of the plow foot, and secure the same. The device is light in weight and possesses great durability, inasmuch as the parts are all of metal and are not of a complicated arrangement and construction and may be drawn over any field without excessive strain on the draft animals, and as the frame is connected with the plow stock from both its rear ends as well as from its front point, the device will run evenly over the ground and will loosen the soil thoroughly around all the plants without digging up any of the same or without uncovering any seeds which have not sprouted. Should it be desired to have the harrow moved over a row of plants, the teeth which would naturally ride directly upon the plants may be inverted in the manner hereinbefore described, so that injury to the plants will not occur.

The advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. The combination of a V-shaped harrow frame, a V-shaped brace having its ends secured to the said frame and its apex provided with means for securing the same to a plow stock, and a rigid connection between the apex of the frame and the said plow stock.

2. In a harrow, the combination of a V-shaped frame, and a V-shaped brace secured to the rear ends of the said frame and having its central portion adapted to be secured to a plow stock.

3. In a harrow, the combination of a V-shaped frame, a connecting plate secured to the front point of the said frame and extending rearwardly therefrom and having its rear end formed into a lip adapted to bear against the front side of a plow stock, and a V-shaped brace secured to the rear ends of the frame and having its central portion extending across and lying against the said lip whereby the said brace and lip may be secured to a plow stock.

4. In a harrow, the combination of a V-shaped frame, a V-shaped brace secured to the rear ends of the said frame and having its central portion adapted to be secured to a plow stock, and a connection between the apex of the brace and the apex of the frame.

5. The combination of the harrow frame, a V-shaped brace having its ends secured to the said frame and its apex provided with means for securing the same to a plow stock, the apex of the brace being spaced from the front end of the frame, and a rigid connection between the said frame and the apex of the said brace, said connection being attached also to the plow stock.

In testimony, that I claim the foregoing as my own, I have hereto affixed my signature in the presence of two witnesses.

ROBERT DAVID WHITT.

Witnesses:
 M. L. CARRAWAY,
 C. T. ROGERS.